April 9, 1929.   F. H. ROYCE   1,708,901
INTERNAL COMBUSTION ENGINE
Filed Jan. 8, 1926   4 Sheets-Sheet 1
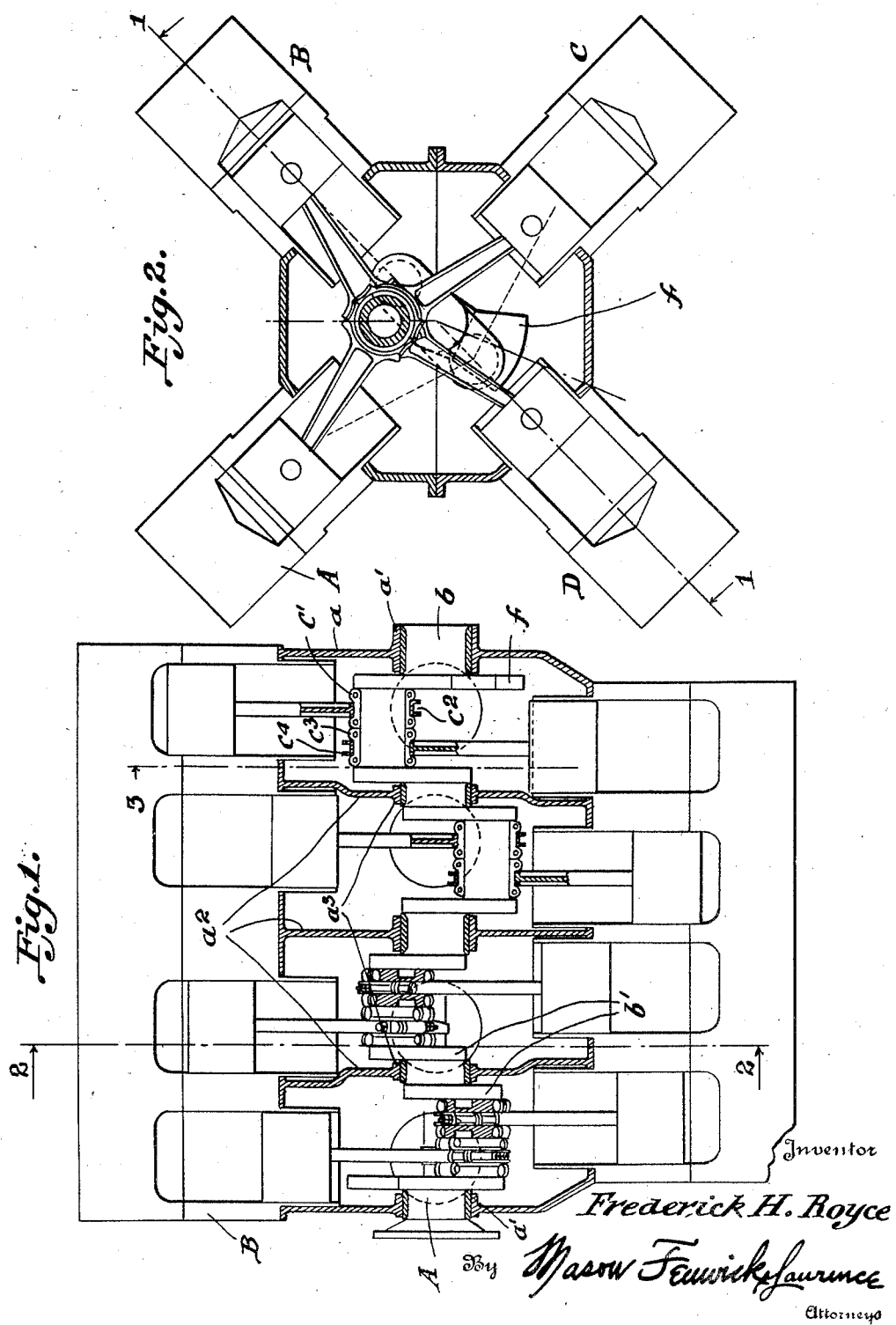
Inventor
Frederick H. Royce
By Mason Fenwick Lawrence
Attorneys Inventor
Frederick H. Royce April 9, 1929.  F. H. ROYCE  1,708,901
INTERNAL COMBUSTION ENGINE
Filed Jan. 8, 1926   4 Sheets-Sheet 3
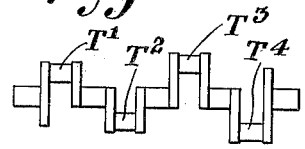
Fig.5.
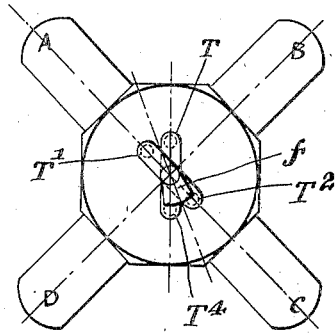
Fig.6.
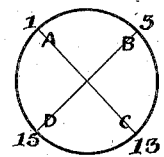 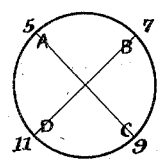 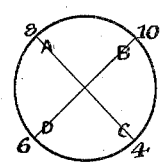 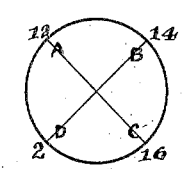
Fig.7.   Fig.8.   Fig.9.   Fig.10.
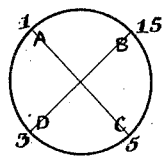 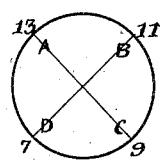 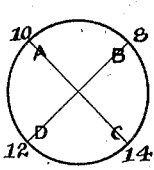 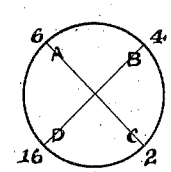
Fig.11.   Fig.12.   Fig.13.   Fig.14.
Inventor
Frederick H. Royce
By Mason Fenwick & Lawrence
Attorneys April 9, 1929.   F. H. ROYCE   1,708,901
INTERNAL COMBUSTION ENGINE
Filed Jan. 8, 1926   4 Sheets-Sheet 4
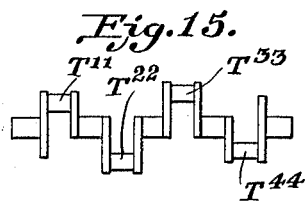
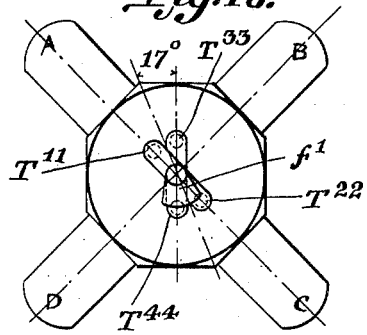
  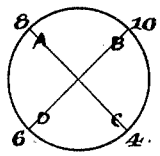 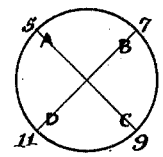
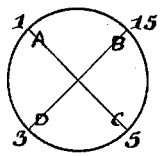 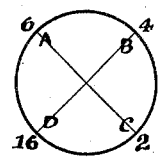 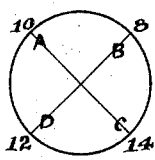 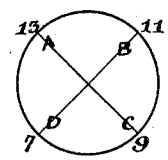
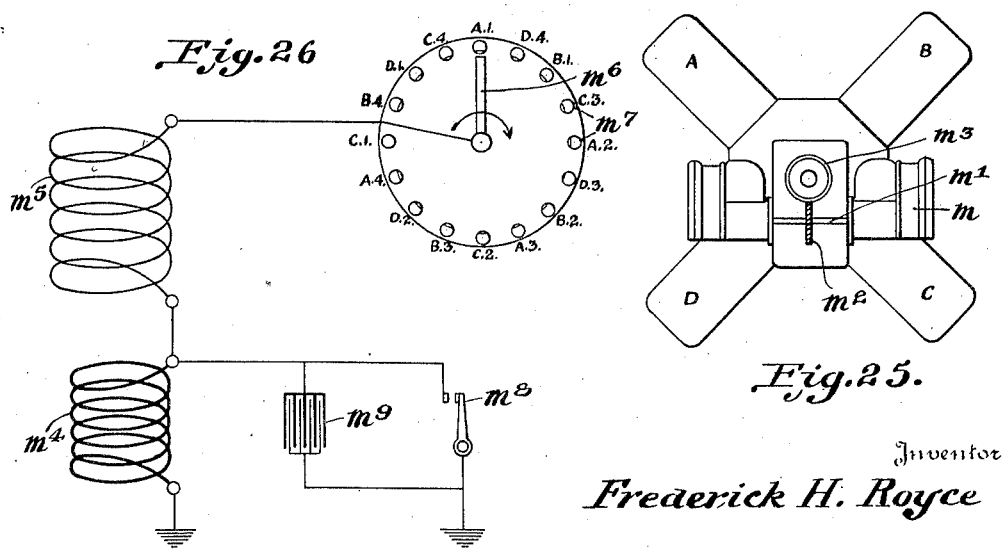
Inventor
Frederick H. Royce
By Mason Fenwick & Lawrence,
Attorneys Patented Apr. 9, 1929.

1,708,901

UNITED STATES PATENT OFFICE.

FREDERICK HENRY ROYCE, OF WEST WITTERING, NEAR CHICHESTER, ENGLAND, ASSIGNOR TO ROLLS-ROYCE LIMITED, OF DERBY, ENGLAND.

INTERNAL-COMBUSTION ENGINE.

Application filed January 8, 1926, Serial No. 80,073, and in Great Britain January 13, 1925.

This invention has reference to multi-cylinder internal combustion engines of the type in which the cylinders are arranged in rows.

In such engines the shaft is subjected to bending strains, and great strains are put on the shaft bearings, and the case, due to the inertia of the reciprocating and rotating masses and the firing impulses, and many forms of engines have been adopted with various arrangements of cylinders and forms of shaft with a view to balancing opposing forces and removing or eliminating the strains referred to, but with only partial success.

This invention is a new combination of shaft, and cylinder arrangement, and firing which secures firing overlap throughout all sixteen cylinders with a consequent even distribution and balancing of forces on the shaft, to the relief of the strains referred to.

According to this invention the engine has four rows of four cylinders evenly spaced around a four throw crank shaft, and the throws of the shaft are in two planes cutting one another at angles of 45° and 135°; and so arranged that an end throw, is in the same plane as that of the contiguous throw, or that of the other end throw, and on the opposite side of the shaft, and the remaining two throws (in the other plane) are on opposite sides of the shaft to one another, and so that no two contiguous throws (the shaft being viewed end-on) would form an angle of less than 135° and balance weights are secured to the ends of the shaft, and the cylinders are arranged to be fired singly in sequence, all being fired in two revolutions, the engine being a four cycle engine.

An engine so constructed presents several important advantages as against engines heretofore in vogue, and at the same time involves some disadvantages, the result however being a much more efficient engine. The arrangement of cylinders, and the shape of the crankshaft, enable the firing sequence to be arranged so that the firing impulses of particular cylinders to an extent balance one another, that is to say, it may be arranged that those of the second cylinders of the rows so far as practicable be countered by those of the third cylinders or those of the third cylinders by those of the second or it may be arranged that those of the first and second cylinders of the rows be countered by those of the second and first cylinders respectively, and those of the third and fourth cylinders be countered by those of the fourth and third respectively. The first said arrangement relieves the strain on the central bearing, and the second said arrangement relieves the strain on the intermediate bearings, the choice depending on the designing exigencies of the particular engine which in some cases requires the intermediate bearings to be made shorter, a condition calling for a lighter load. The firing of the whole sixteen cylinders singly in two revolutions is of great importance, affording a more even torque than if they were fired in pairs; this is rendered possible by the peculiar shape of the crank shaft in which the cranks are in two planes as stated. The arrangement of cranks alternately on opposite sides of the shaft (subject to the deviation consequent on the two planes formation) materially reduces the strain on the central bearing. The form of shaft adopted causes an out-of-balance, which would not be present if the shaft were in common form for a four throw shaft, that is to say with the two centre throws on one side and the two end throws on the other side, and to eliminate or reduce to a minimum this out-of-balance couple balance weights are secured one at each end of the shaft or on the end throws. The centre of gravity of each balance weight in the case of a shaft of which each end throw is in the same plane as the adjacent throw, lies in a plane which bisects the angles of 45° formed by the two planes containing the throws, and the radial line from the axis of the shaft therethrough forms with the contiguous or adjacent end throw when viewed end-on an angle of 157.5°.

The centre of gravity of each balance weight in the case when the two end throws are in the same plane and the two other throws in a common plane lies in a plane which divides the angle of 45° formed by the two planes containing the throws and the radial line from the axis of the shaft therethrough forms with the contiguous throw, when viewed end-on an angle of approximately 163°. It will be observed that in the first mentioned form of shaft the deviation of the plane of two throws from the plane of the other two, is a move towards a perfectly balanced shaft to wit, one in which the throws are all in the same plane, with the two end throws on one side and the two centre throws on the other side of the shaft; whereas in the secondly mentioned form of shaft the deviation of the plane of the two central throws from that of the two end throws is a move towards the most out-of-balance shaft, to wit that in which the throws are all in one plane and the first and second throws are on one side, and the third and fourth on the other side of the shaft. This accounts for the difference in the location of balance weights as between the two forms of shaft.

Preferably of the four connecting rods operating on one throw two, operated by two of the cylinders at angles of 90° to one another, are interlocked and located on one half of the throw while the other two connecting rods are likewise interlocked and located on the other half of the throw and the two cylinders actuating the first two rods and those actuating the latter two rods respectively are staggered in relation to one another.

Preferably also the cylinders are arranged so that their axes are 45° out of the vertical, and the staggering is so arranged that of the eight upper cylinders four are shifted away from the other four while of the eight lower ones four are shifted toward the other four, that is to say referring to the drawing hereinafter described of the cylinders of rows A and B cylinders 2 and 3 are spaced apart farther than cylinders 1 and 2 or 3 and 4 but of the cylinders of rows C and D the cylinders 2 and 3 are spaced apart less than the cylinders 1 and 2 or 3 and 4.

The sequence of firing is determined by the following considerations and such sequence is rendered possible by the arrangement of cylinders and shape of crank shaft.

1. To fire the cylinders singly and evenly spaced to give even torque.

2. To secure as far as possible equal intervals between ignitions in each of the four blocks of cylinders, that is to say in first second third and fourth cylinders of each row respectively.

3. To secure so far as practicable in the case where the first and second throws are in one plane and the third and fourth in the other, that the firing of the second cylinder of a row shall be followed by the firing of the third cylinder of an opposite row or vice versa and in the case where the end throws are in one plane and the two centre throws in the other, that the firing of the first or second cylinder of a row shall be followed by the firing of the second or first cylinder of an opposite row and similarly in reference to the third and fourth cylinders of the rows.

A further important advantage of the described sequence of firing impulses lies in the reversing of the load on the bearings by firing opposite cylinders in sequence which facilitates the lubrication of the bearings.

Examples of my invention are illustrated in the accompanying drawings.

Fig. 1 is a section on line 1—1 of Fig. 2 and Fig. 2 a section on line 2—2 of Fig. 1 of an engine in which the first and second throws of the shaft are in one plane and the third and fourth throws in the other.

Fig. 5 is a diagrammatic elevation of one form of crankshaft made in accordance with the invention and Fig. 6 a diagrammatic end on view of the engine with such a shaft. Figs. 7, 8, 9 and 10 illustrate the firing order in the case of a crankshaft as illustrated in Fig. 5 if the engine is turned clockwise, and Figs. 11, 12, 13 and 14 if turned anti-clockwise. Fig. 15 is a diagrammatic elevation of the other form of crankshaft made in accordance with this invention and Fig. 16 a diagrammatic end-on view of an engine with such a shaft. Figs. 17, 18, 19 and 20 illustrate the order of firing in the case of a crank shaft as illustrated in Fig. 15 if the engine is turned clockwise and Figs. 21, 22, 23 and 24 if turned anti-clockwise. Figs. 25 and 26 illustrate diagrammatically a means of firing the cylinders in the prescribed order, the order illustrated by way of example being that shown in Figs. 7, 8, 9 and 10. The means described of firing cylinders in the described sequence or any other sequence is not new in itself.

$a$ is the case, $a^1$ the end bearing, $a^2$ are webs across the case supporting bearings $a^3$, $b$ is the shaft, and $b^1$ are throws. A are cylinders constituting one row, B another row, C a third row and D the fourth row 1, 2, 3, and 4 indicate the cylinders of each row in succession from left to right of Fig. 1, $c^1$, and $c^2$ are the big ends of two connecting rods operated by pistons of two corresponding cylinders of rows A and B and $c^3$ and $c^4$ are the big ends of like corresponding cylinders of the other two rows.

The big ends of the connecting rods $c^1$ and $c^3$ are bifurcated and those of $c^2$ and $c^4$ are mounted between the forks thereof. The big ends on each of the other throws are similarly arranged.

Figure 3:
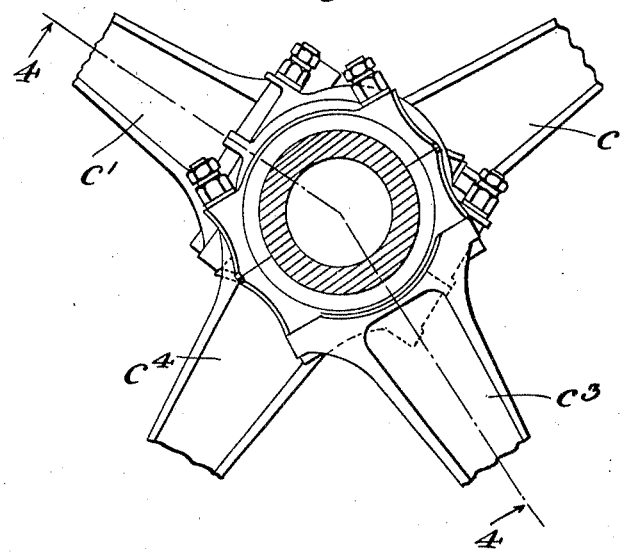
Fig. 3 is a view of four big ends of connecting rods on one crank for example on a section through the crankshaft on line 3—3 of Fig. 1.
Figure 4:
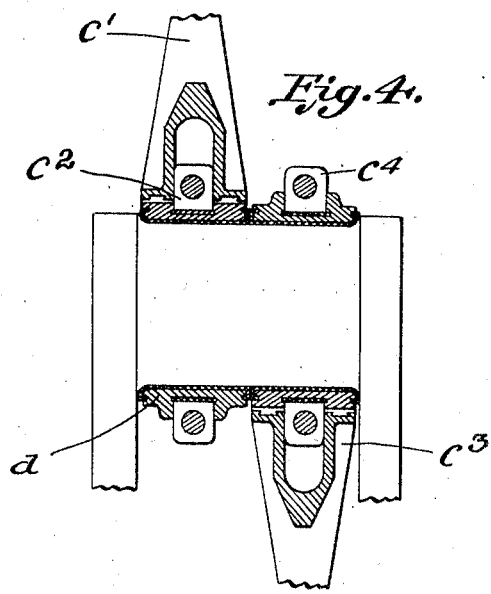
Fig. 4 is a section on line 4—4 of Fig. 3 through the axis of the crank shaft also showing four big ends on one throw.

Of the four cylinders operating on one throw each pair whose connecting rods are interlocked are staggered in relation to the other pair as shown in Fig. 1. Each of the big ends $c^1$ and $c^3$ is bolted to and carried with it a steel bush $d$ (see Fig. 4) which is lined internally throughout, and externally between the bifurcations. $f$ in Figs. 1, 2, and 6 and $f^1$ in Fig. 16 are balance weights.

Referring to Figs. 5 and 6, $T^1$, $T^2$, $T^3$, and $T^4$ are the several throws of one form of crank shaft. Each of Figs. 7, 8, 9 and 10, represent respectively throws $T^1$, $T^2$, $T^3$ and $T^4$ and the block of cylinders respectively associated therewith, the letters A. B. C. D refer to rows of cylinders. The numbers outside the figures indicate the order of firing.

Referring to Figs. 15 and 16 $T^{11}$, $T^{22}$, $T^{33}$, $T^{44}$, are the several throws of another form of crankshaft. Each of the figures 17, 18, 19 and 20 represent respectively the throws $T^{11}$, $T^{22}$, $T^{33}$ and $T^{44}$ and the blocks of cylinders with which they are respectively associated, the letters A. B. C. D refer to rows of cylinders. The letters outside the figures indicate the order of firing. The centre of gravity of the balance weights $f$ are in a plane which contains the axis of the shaft and bisects the angle of 45° made by the planes which contain the shaft and respectively the throws. The balance weights $f^1$ are in a plane which contains the shaft, divides the angles of 45° made by the planes containing the throws and makes with the plane containing the adjacent end throws an angle of 163°.

Referring to Figs. 25 and 26, Fig. 25 is an end view of an engine, $m$ are two magnetos, but each one is provided with separate connections, and sparking plugs, the ignition apparatus being duplicated as a precaution in case one should fail.

The magnetos have a common spindle $m^1$ on which is mounted a skew gear wheel $m^2$ which engages a skew gear wheel $m^3$ on the engine shaft. Fig. 26 illustrates diagrammatically the arrangement of the magneto, $m^4$ is the primary circuit earthed at both ends with the make and break device in the circuit, $m^5$ the secondary winding earthed at one end through the primary coil and at the other end connected to the distribution $m^6$, which makes contact in turn with the terminals $m^7$, which are connected to the sparking plugs of the various cylinders, $m^8$ is the make and break device and $m^9$ the condenser.

The order of firing above described is the preferred order but not the only suitable order.

The cylinders are fired by any suitable means which are well known in the art.

With an engine constructed as above many of the impulses communicated to the shaft are practically balanced and the bending strains on the shaft and the strains on the bearings, and hence on the case are reduced one form of the shaft favouring relief to the centre bearing and the other form to the intermediate bearings. In the result the speed can be increased and the weight and size reduced in relation to the H. P. attained.

It will be understood that small deviations might be made from the angular relationship of parts hereinbefore described without departing from the spirit of this invention.

What I claim is:—

1. An internal combustion engine comprising a four-throw crank shaft having two contiguous throws coplanar and having the remaining two throws lying in a plane intersecting the plane of the first named throws at angles of forty-five and one hundred and thirty-five degrees, the throws in the same plane being on opposite sides of the shaft to one another, and contiguous throws which are not in the same plane forming angles when viewed end on of one hundred and thirty-five and two hundred and twenty-five degrees, a balance weight projecting from each end of the shaft, four rows of cylinders equi-spaced around the crank shaft and each cylinder provided with a piston, connecting rods operably connecting the piston of the first, second and third and fourth cylinders of each row, respectively, with the first, second, third and fourth rows, and means for firing the cylinders singly in the course of two revolutions.

2. An internal combustion engine comprising a four-throw crank shaft having the first two throws in one and the remaining two throws in the other of two intersecting planes lying at angles of forty-five and one hundred and thirty-five degrees to each other, the throws in the same plane being on opposite sides of the shaft to one another, and the contiguous throws which are not in the same plane forming angles with each other when viewed end on of one hundred and thirty-five and two hundred and twenty-five degrees, a balance weight projected from each end of said shaft, the center of gravity of each weight being located relatively to the adjacent end throw in a plane bisecting the angles of forty-five formed by the throws and in a radial line forming with such adjacent throw, viewed end-on, an angle of one hundred and fifty-seven and one-half degrees, four rows of cylinders equi-spaced around the crank shaft and each cylinder provided with a piston, piston rods operably connecting the pistons of the first second, third and fourth cylinders of each row, respectively, to the first, second, third and fourth throws, and means for firing the cylinders singly in the course of two revolutions.

3. An internal combustion engine comprising a four-throw crank shaft having two contiguous throws in one and the remaining two throws in the other of two intersecting planes formed at angles of forty-five and one hundred and thirty-five degrees to each other, throws in the same plane being on opposite sides of the shaft to one another, contiguous throws which are not in the same plane forming angles when viewed end-on of one hundred and thirty-five and two hundred and twenty-five degrees, a balance weight projected from each end of the shaft, four rows of cylinders equi-spaced around the crank shaft and each cylinder provided with a piston, piston rods connected to the piston of the first, second, third and fourth cylinders of each row, respectively, and directly connected to the first, second, third and fourth throws, respectively, and means for firing the cylinders singly in the course of two revolutions.

4. An internal combustion engine comprising a four-throw crank shaft having the first two throws in one and the remaining two throws in the other of two intersecting planes lying at angles of forty-five and one hundred and thirty-five degrees to each other, the throws in the same plane being on opposite sides of the shaft to one another, and the contiguous throws which are not in the same plane forming angles with each other when viewed end-on of one hundred and thirty-five and two hundred and twenty-five degrees, a balance weight projected from each end of said shaft, the center of gravity of each weight being located relatively to the adjacent end throw in a plane bisecting the angles of forty-five formed by the throws and in a radial line forming with such adjacent throw, viewed end-on, an angle of one hundred and fifty-seven and one-half degrees, four rows of cylinders equi-spaced around the crank shaft and each cylinder provided with a piston, piston rods connected to the piston of the first, second, third and fourth cylinders of each row, respectively, and directly connected to the first, second, third and fourth throws, respectively, and means for firing the cylinders singly in the course of two revolutions.

5. An internal combustion engine comprising a four-throw crank shaft having two contiguous throws coplanar and having the remaining two throws lying in a plane intersecting the plane of the first named throws at angles of forty-five and one hundred and thirty-five degrees, the throws in the same plane being on opposite sides of the shaft to one another, and contiguous throws which are not in the same plane forming angles when viewed end-on of one hundred and thirty-five and two hundred and twenty-five degrees, a balance weight projecting from each end of the shaft, four rows of cylinders equi-spaced around the crank shaft and each cylinder provided with a piston, connecting rods operably connecting the piston of the first, second and third and fourth cylinders of each row, respectively, with the first, second, third and fourth throws, and means for firing the cylinders singly in the course of two revolutions, the bearing ends of the two rods of each pair being interlocked.

6. An internal combustion engine comprising a four-throw crank shaft having two contiguous throws coplanar and having the remaining two throws lying in a plane intersecting the plane of the first named throws at angles of forty-five and one-hundred and thirty-five degrees, the throws in the same plane being on opposite sides of the shaft to one another, and contiguous throws which are not in the same plane forming angles when viewed end-on of one hundred and thirty-five and two hundred and twenty-five degrees, a balance weight projecting from each end of the shaft, four rows of cylinders equi-spaced around the crank shaft and each cylinder provided with a piston, piston rods connecting the pistons of the first, second, third and fourth cylinders of each row, respectively, with the first, second, third and fourth throws, in pairs, the crank rod of each throw being provided with a steel bushing lined with white metal internally throughout its length, one bearing end of each pair of piston rods being bifurcated and bolted to the steel bushing, the other bearing end of such pair of rods rocking on the steel bushing between the bifurcations of the first named rod of said pair, said bushing being lined externally between the said bifurcations, and means for firing the cylinders singly in the course of two revolutions.

In witness whereof I have signed this specification.

FREDERICK HENRY ROYCE.